US010776169B2

(12) United States Patent
Teshler et al.

(10) Patent No.: US 10,776,169 B2
(45) Date of Patent: Sep. 15, 2020

(54) SPECIALLY PROGRAMMED COMPUTING SYSTEMS WITH ASSOCIATED DEVICES CONFIGURED TO IMPLEMENT CENTRALIZED SERVICES ECU BASED ON SERVICES ORIENTED ARCHITECTURE AND METHODS OF USE THEREOF

(71) Applicant: GuardKnox Cyber Technologies Ltd., Rosh Haain (IL)

(72) Inventors: Dionis Teshler, Tel Aviv (IL); Moshe Shlisel, Rosh Ha Ain (IL); Idan Nadav, Holon (IL)

(73) Assignee: GuardKnox Cyber Techologies Ltd., Rosh Haain (IL)

( * ) Notice: Subject to any disclaimer, the term of this patent is extended or adjusted under 35 U.S.C. 154(b) by 44 days.

(21) Appl. No.: 16/259,886

(22) Filed: Jan. 28, 2019

(65) Prior Publication Data
US 2019/0155650 A1 May 23, 2019

Related U.S. Application Data

(63) Continuation of application No. 16/101,042, filed on Aug. 10, 2018, now Pat. No. 10,191,777, which is a
(Continued)

(51) Int. Cl.
*G06F 9/50* (2006.01)
*H04L 9/08* (2006.01)
(Continued)

(52) U.S. Cl.
CPC ............ *G06F 9/505* (2013.01); *G06F 9/5027* (2013.01); *G06F 9/545* (2013.01); *G06F 21/50* (2013.01);
(Continued)

(58) Field of Classification Search
CPC ..... H04L 67/12; H04L 2209/84; H04L 41/04; H04L 63/20; H04L 2012/40273; G06F 21/50; H04W 4/40
See application file for complete search history.

(56) References Cited

U.S. PATENT DOCUMENTS 6,484,082 B1 * 11/2002 Millsap ............... H04L 12/4035
701/32.7
8,219,728 B2 * 7/2012 Lundqvist ............... H04L 67/12
710/100
(Continued)

OTHER PUBLICATIONS

Helmlin, Markus "Service-oriented Architectures and Ethernet in Vehicles: Towards Data Centers on Wheels with Model-based Methods" PREEvision technical article, Mar. 2017 (Year: 2017).*
(Continued)

*Primary Examiner* — David R Lazaro
(74) *Attorney, Agent, or Firm* — Greenberg Traurig, LLP

(57) ABSTRACT

In some embodiments, the present invention provides for an exemplary inventive system that includes at least the following components: an electronic control unit having a service oriented architecture (SOA ECU), where the SOA ECU includes: at least one exemplary inventive SOA server; where the SOA ECU is located within a vehicle; where the at least one SOA server is configured to provide at least one service to at least one client ECU that is located within the vehicle; and where the at least one SOA server is configured to assign at least one dedicated processing resource and at least one dedicated memory resource to provide the at least one service.

30 Claims, 8 Drawing Sheets

Example architecture of safe and secure SOA ECU

Related U.S. Application Data continuation of application No. 15/863,053, filed on Jan. 5, 2018, now Pat. No. 10,055,260.

(60) Provisional application No. 62/442,745, filed on Jan. 5, 2017.

(51) Int. Cl.

| | | |
|---|---|---|
| *G06F 21/50* | (2013.01) | |
| *G06F 9/54* | (2006.01) | |
| *H04L 29/06* | (2006.01) | |
| *H04L 29/08* | (2006.01) | |
| *H04L 12/24* | (2006.01) | |
| *H04L 9/32* | (2006.01) | |
| *G06F 21/53* | (2013.01) | |

(52) U.S. Cl.
CPC ............ *G06F 21/53* (2013.01); *H04L 9/0822* (2013.01); *H04L 9/0891* (2013.01); *H04L 9/3268* (2013.01); *H04L 41/04* (2013.01); *H04L 67/10* (2013.01); *H04L 67/12* (2013.01); *H04L 67/42* (2013.01); *G06F 2221/0708* (2013.01); *H04L 2209/84* (2013.01)

(56) References Cited

U.S. PATENT DOCUMENTS

| | | | | |
|---|---|---|---|---|
| 10,055,260 | B2* | 8/2018 | Teshler | H04L 67/10 |
| 10,176,326 | B2* | 1/2019 | David | H04L 63/1441 |
| 10,191,777 | B2* | 1/2019 | Teshler | H04L 67/12 |
| 10,382,460 | B2* | 8/2019 | David | G06F 21/552 |
| 2007/0121641 | A1* | 5/2007 | Hovey | H04L 67/02 |
| | | | | 370/395.2 |
| 2008/0039982 | A1* | 2/2008 | Satoh | G06F 9/5027 |
| | | | | 701/1 |
| 2014/0188970 | A1* | 7/2014 | Madhok | H04L 67/04 |
| | | | | 709/201 |
| 2014/0189888 | A1* | 7/2014 | Madhok | H04L 63/08 |
| | | | | 726/29 |
| 2014/0380001 | A1* | 12/2014 | Schubert | G06F 21/554 |
| | | | | 711/153 |
| 2015/0126225 | A1* | 5/2015 | Endo | G06Q 10/101 |
| | | | | 455/456.3 |
| 2015/0133164 | A1* | 5/2015 | Song | H04W 4/046 |
| | | | | 455/456.3 |
| 2015/0207859 | A1* | 7/2015 | Lu | H04L 67/12 |
| | | | | 709/202 |
| 2015/0228131 | A1* | 8/2015 | Hayashi | G07C 5/00 |
| | | | | 701/29.1 |
| 2015/0326529 | A1* | 11/2015 | Morita | G06F 21/6218 |
| | | | | 726/12 |
| 2016/0255154 | A1* | 9/2016 | Kim | H04L 63/1433 |
| | | | | 726/25 |
| 2018/0189103 | A1* | 7/2018 | Teshler | G06F 9/505 |
| 2018/0316699 | A1* | 11/2018 | David | G06F 21/552 |
| 2018/0349192 | A1* | 12/2018 | Teshler | H04L 67/12 |
| 2019/0155650 | A1* | 5/2019 | Teshler | H04L 67/42 |
| 2019/0245890 | A1* | 8/2019 | Zinner | H04L 63/0209 |
| 2019/0268368 | A1* | 8/2019 | Zinner | H04L 69/14 |
| 2019/0268420 | A1* | 8/2019 | Acharya | H04L 63/0823 |

OTHER PUBLICATIONS

Iwai et al. "Automotive cloud service systems based on service-oriented architecture and its evaluation" IEEE 2011 (Year: 2011).*

Wagner et al. "SODA Service-oriented architecture for runtime adaptive driver assistance systems" IEEE 2014 (Year: 2014).*

Gopu et al. "Service oriented architecture based connectivity of Automotive ECUs" 2016 ICCPCT (Year: 2016).*

* cited by examiner

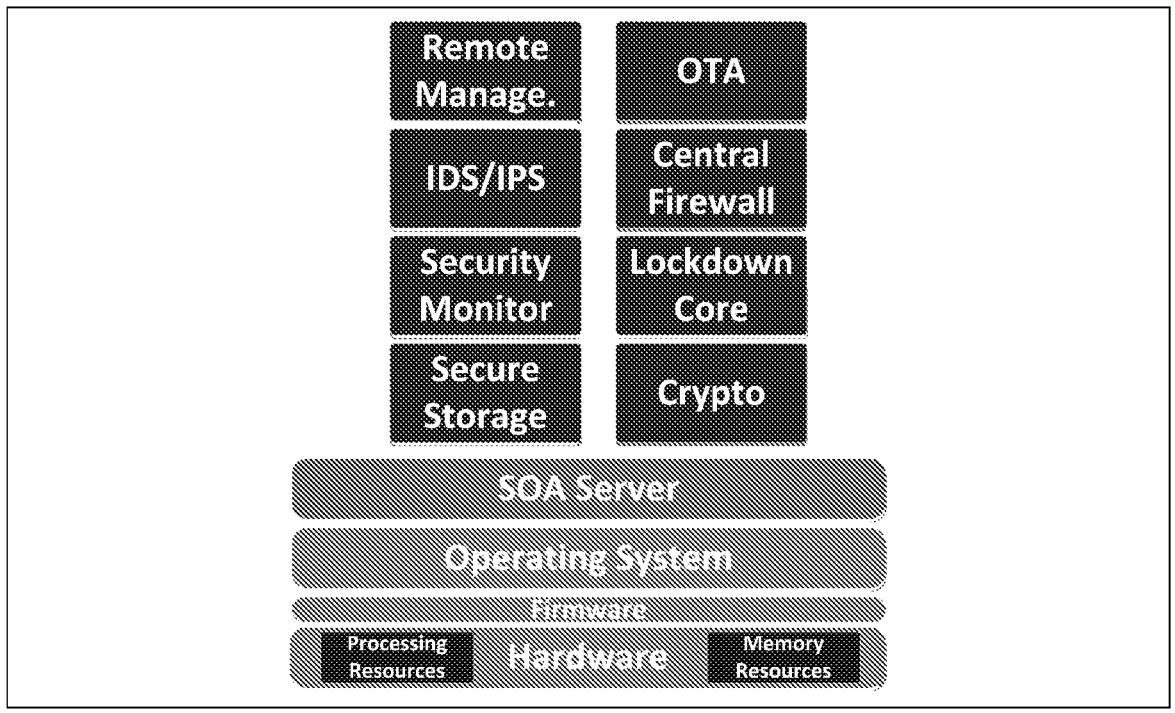
*Figure 1. Centralized inventive SOA ECU architecture example*
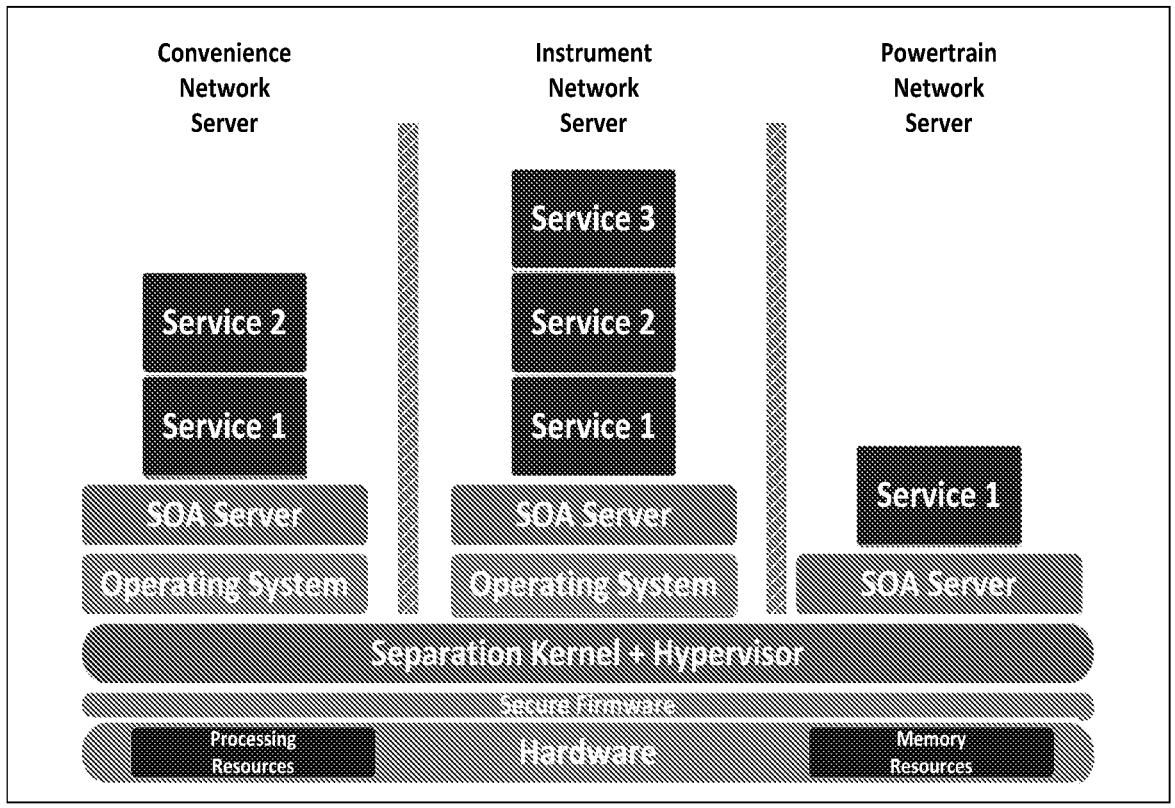
*Figure 2. Example architecture of safe and secure SOA ECU*

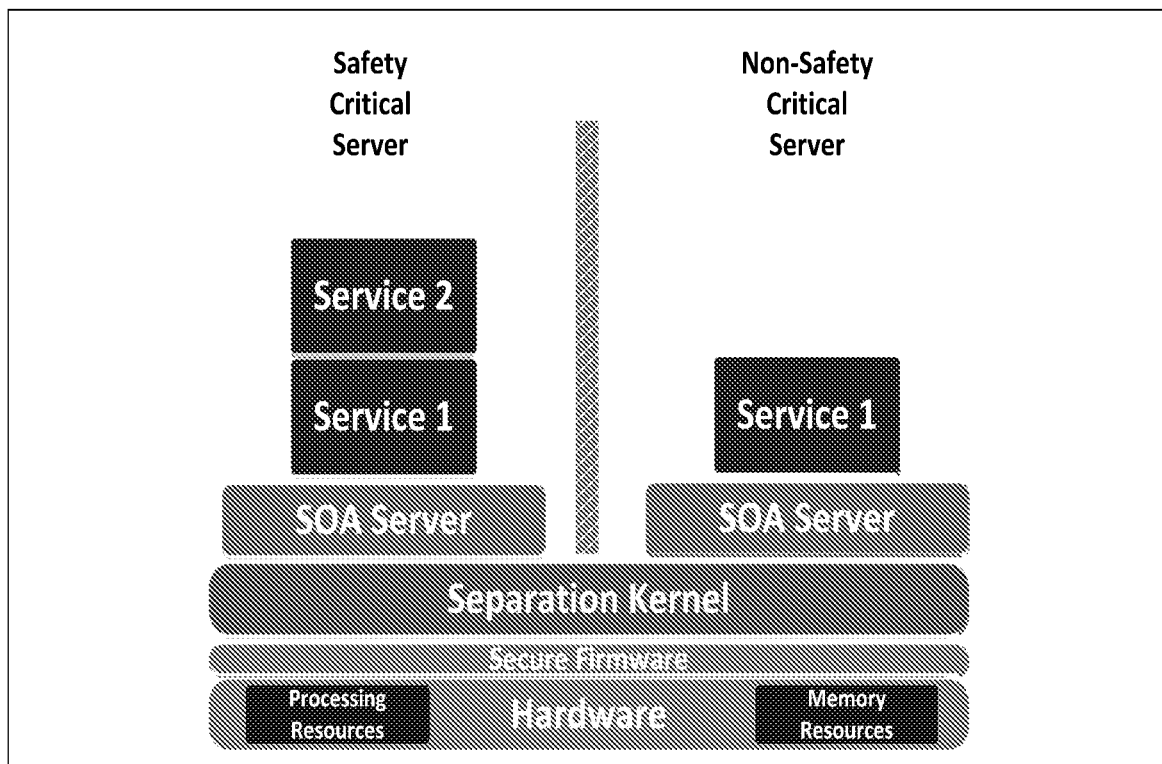
*Figure 3. Example architecture for safe and secure inventive SOA ECU with separation between safety and non-safety services*

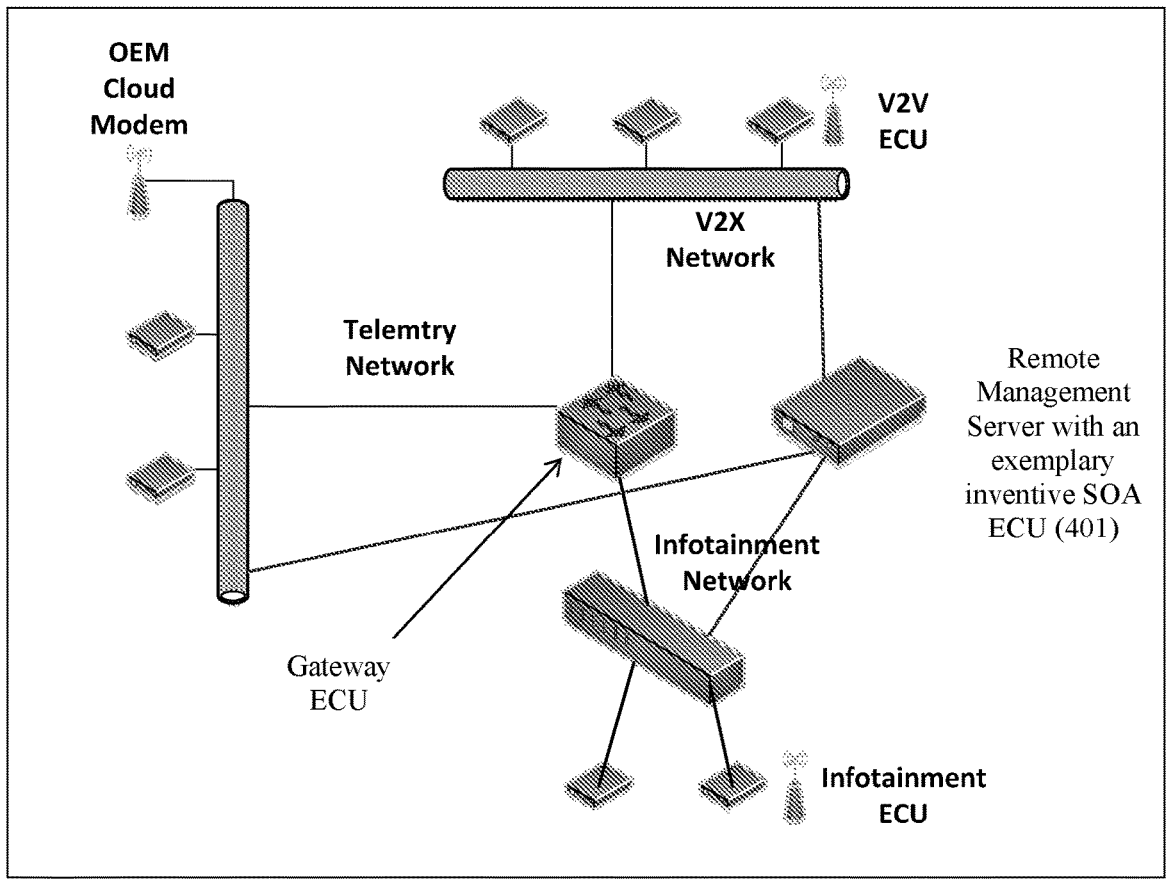
*Figure 4. SOA remote management server with an exemplary inventive SOA ECU*
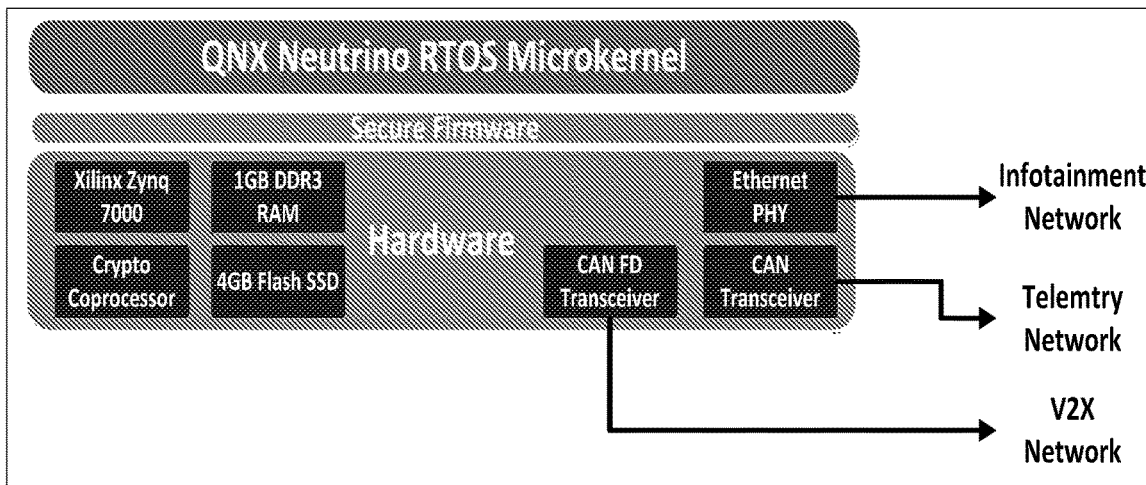
*Figure 5. A hardware architecture example of SOA remote management server with an exemplary inventive SOA ECU*

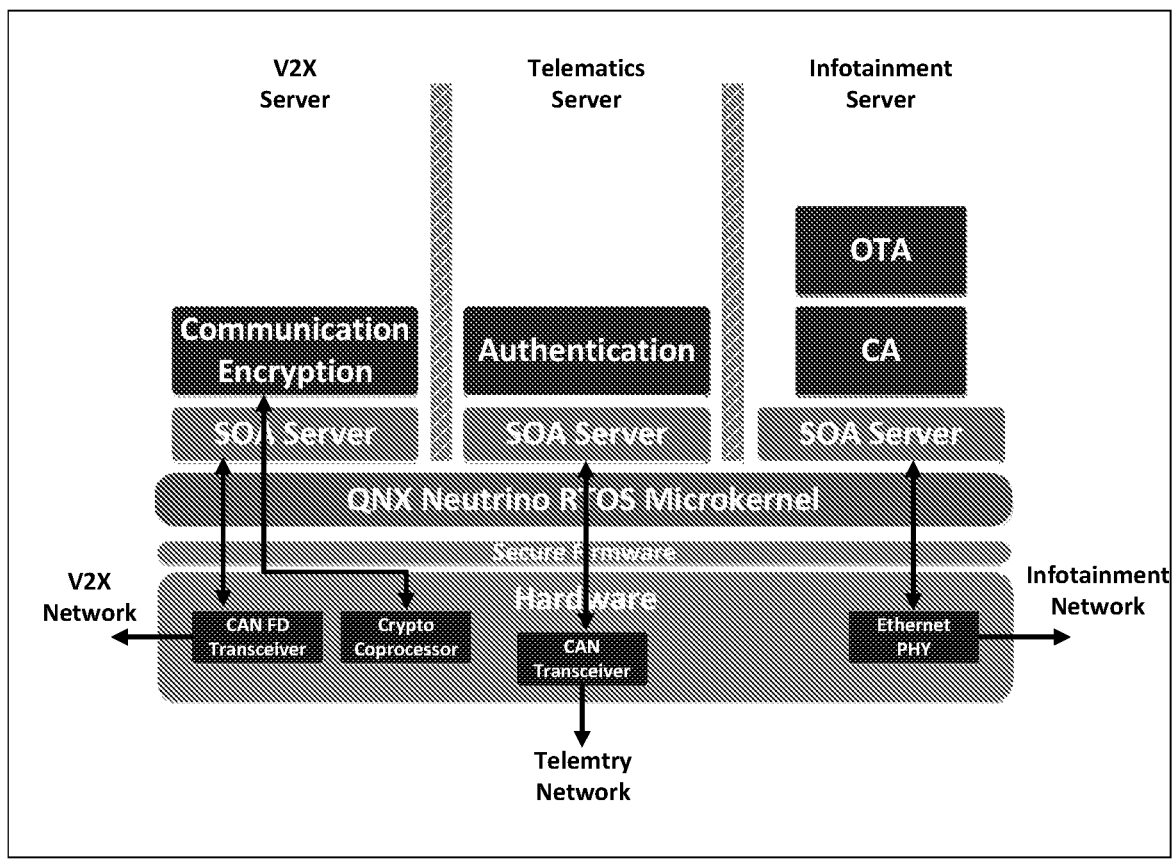
Figure 6. Remote management server software architecture

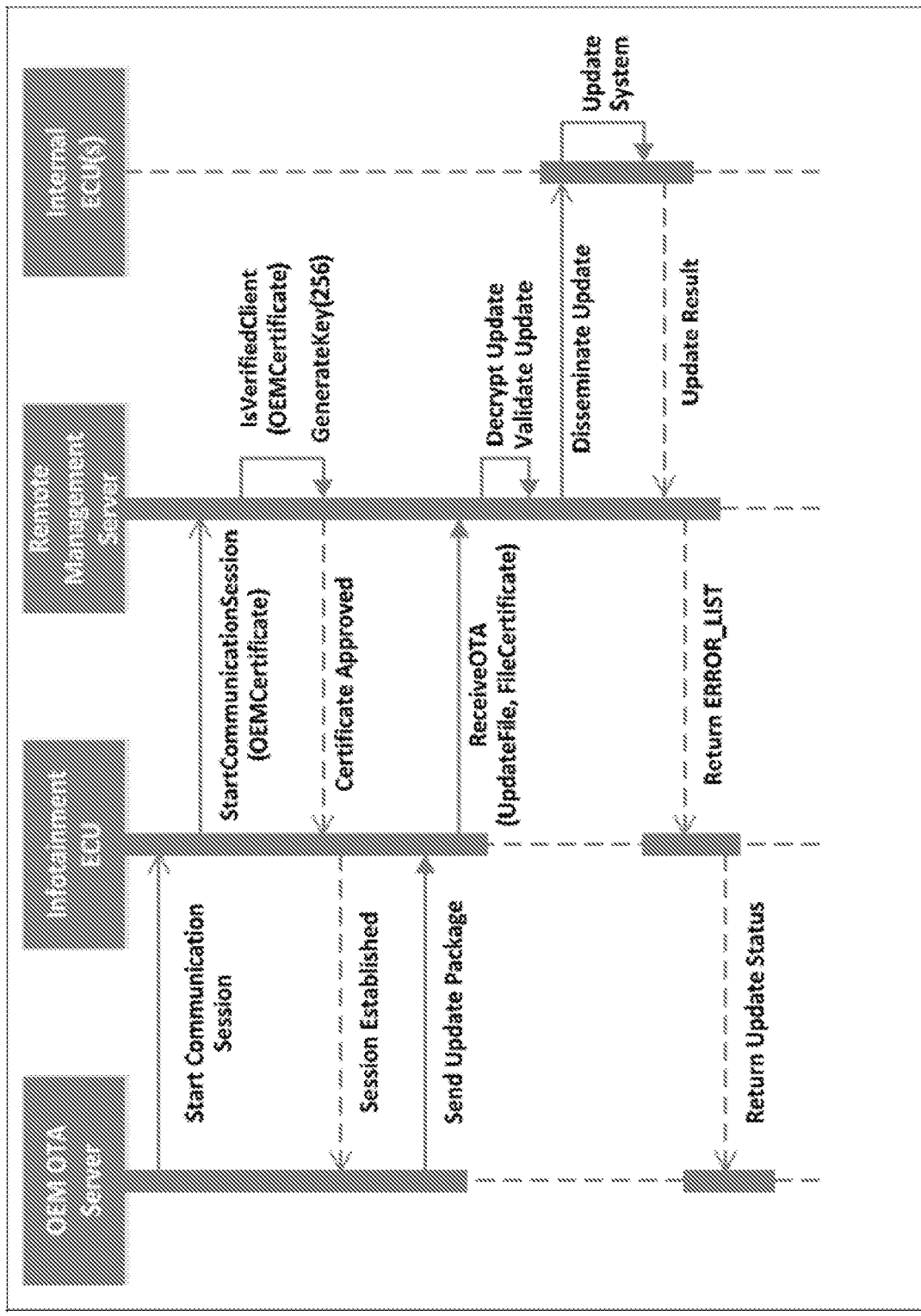
Figure 7. OTA process example using remote management ECU services

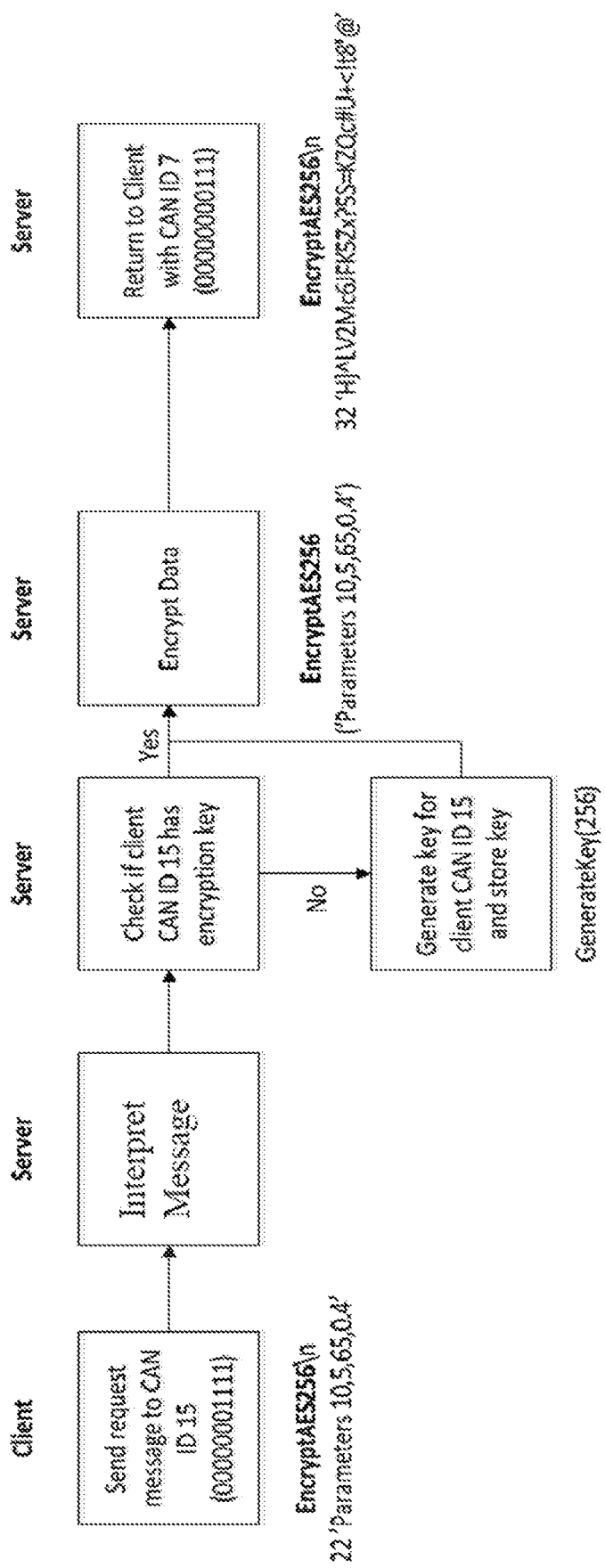
Figure 8. Communication encryption service request example

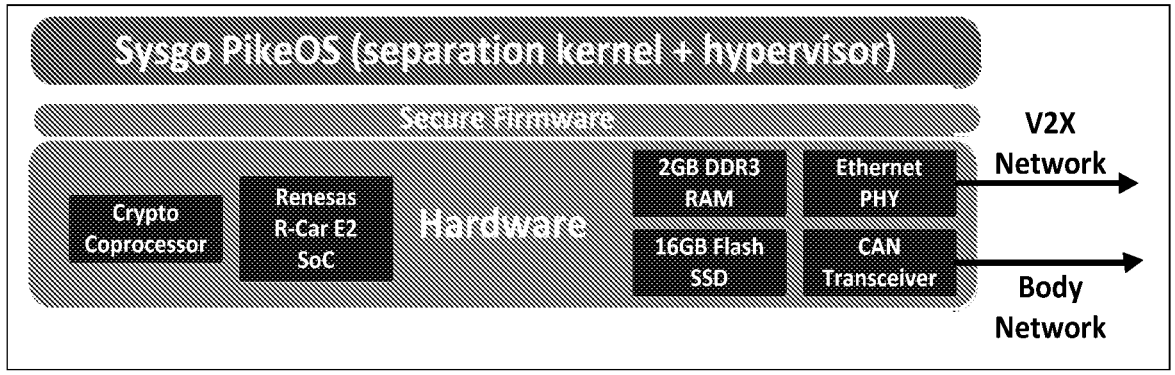
Figure 9. Example security server ECU architecture
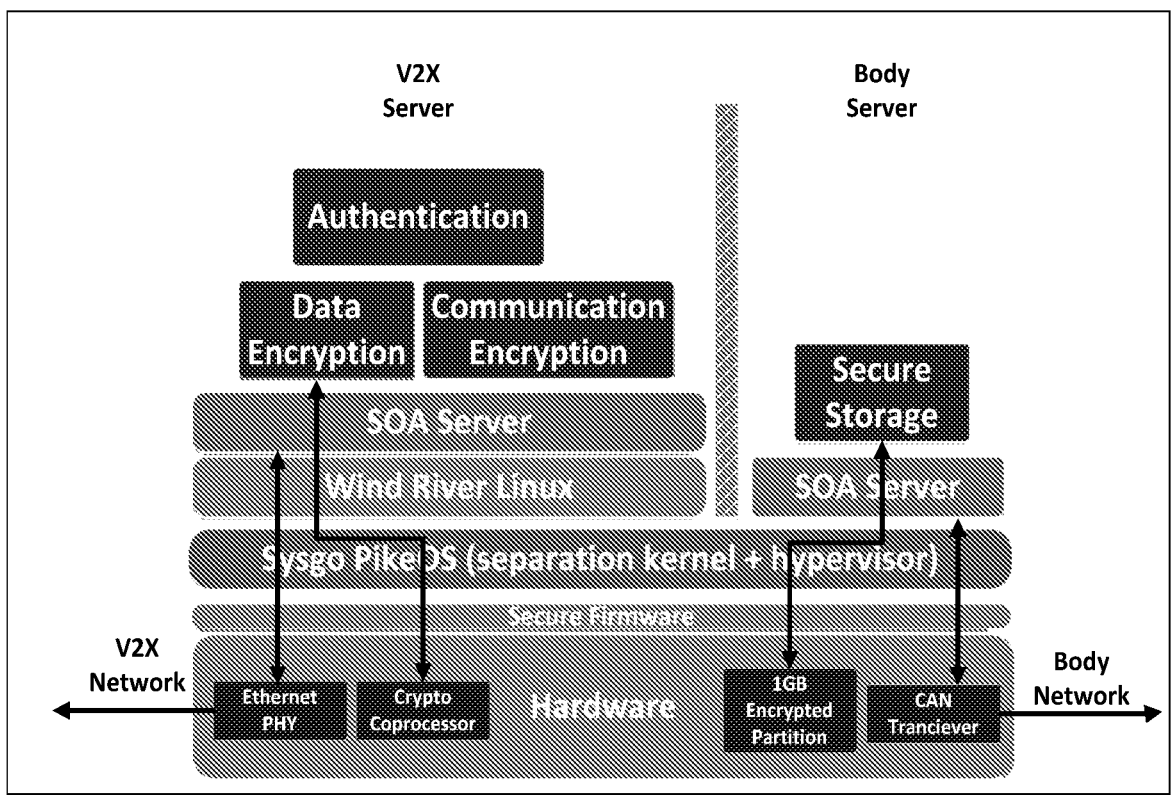
Figure 10. The inventive SOA security server architecture example

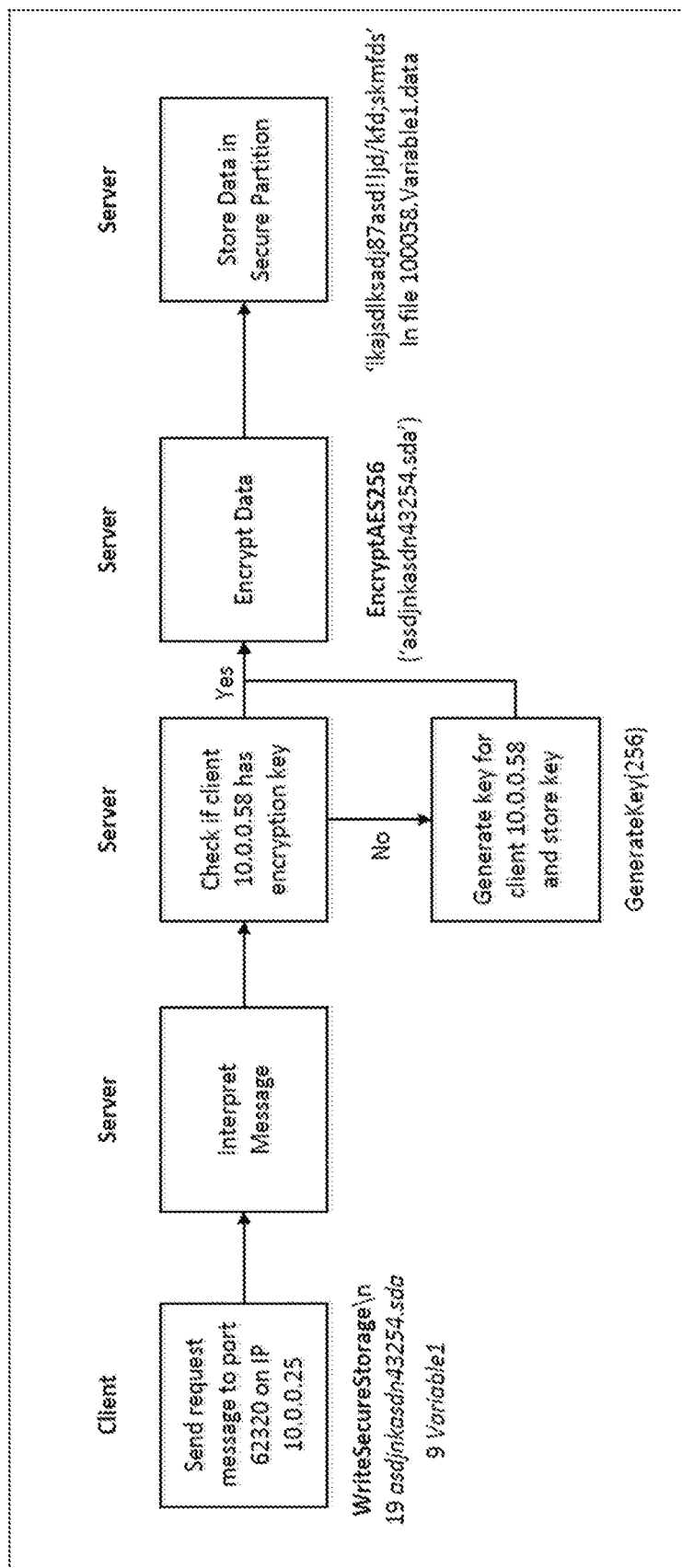
*Figure 11. Secure storage service request example*

SPECIALLY PROGRAMMED COMPUTING SYSTEMS WITH ASSOCIATED DEVICES CONFIGURED TO IMPLEMENT CENTRALIZED SERVICES ECU BASED ON SERVICES ORIENTED ARCHITECTURE AND METHODS OF USE THEREOF

RELATED APPLICATIONS

This application is a continuation of U.S. patent application Ser. No. 16/101,042, filed Aug. 10, 2018, which is a continuation of U.S. patent application Ser. No. 15/863,053, filed Jan. 5, 2018, which claims the priority of U.S. Provisional Appln. No. 62/442,745, filed Jan. 5, 2017, which are incorporated herein by reference in their entirety for all purposes.

FIELD OF THE INVENTION

In some embodiments, the present invention generally relates to specially programmed computing systems with associated devices configured to implement centralized services ecu based on services oriented architecture and methods of use thereof.

BACKGROUND OF THE INVENTION

For example, a vehicle may include a multitude of computers, Electronic Control Units (ECUs). Typically, ECUs may be interconnected through various networks which may include external communication capabilities, such as Bluetooth™, 3G, Wi-Fi, and others. In some cases, such exemplary external communication capabilities may be utilized to track, control and/or update the vehicle's ECUs and/or operational capabilities.

SUMMARY OF THE INVENTION

In some embodiments, the present invention provides for an exemplary inventive system that includes at least the following components: an electronic control unit having a service oriented architecture (SOA ECU), where the SOA ECU includes: at least one exemplary inventive SOA server; where the SOA ECU is located within a vehicle; where the at least one SOA server is configured to provide at least one service to at least one client ECU that is located within the vehicle; and where the at least one SOA server is configured to assign at least one dedicated processing resource and at least one dedicated memory resource to provide the at least one service.

In some embodiments, the exemplary SOA ECU further includes: at least one first partition, including: at least one first SOA server; where the at least one first SOA server is configured to provide at least one first service to at least one first client ECU; where the at least one first SOA server is configured to assign at least one first dedicated processing resource and at least one first dedicated memory resource to provide the at least one first service; at least one second partition, including: at least one second SOA server; where the at least one second SOA server is configured to provide at least one second service to at least one second client ECU; where the at least one second SOA server is configured to assign at least one second dedicated processing resource and at least one second dedicated memory resource to provide the at least one second service; where the at least one first partition and the at least one second partition are operationally separated from each other via a separation kernel.

In some embodiments, the at least one first partition is configured to execute at least one first operating system (OS) with the at least one first dedicated processing resource and the at least one first dedicated memory resource; and where the at least one second partition is configured to execute at least one second OS with the at least one second dedicated processing resource and the at least one second dedicated memory resource; and where the at least one first dedicated processing resource and the at least one second dedicated processing resource are part of at least one dedicated hardware module; where the separation kernel is configured to separately provide to the at least one first dedicated processing resource and the at least one second dedicated processing resource a respective separate access for performing the at least one first service or the at least one second service respectively; and where the at least one first dedicated memory resource and the at least one second dedicated memory resource are part of the at least one dedicated hardware module; and the separation kernel is configured to separately provide to the at least one first dedicated memory resource and the at least one second dedicated memory resource a respective separate access for performing the at least one first service or the at least one second service respectively.

In some embodiments, the at least one first SOA server is a safety critical server and the at least one second SOA server is a non-safety critical server.

In some embodiments, the at least one first client ECU is associated with at least one first network; where the at least one second client ECU is associated with at least one second network; and where the at least one first network and the at least one second networks are distinct networks.

In some embodiments, the separation kernel is configured to prevent or stop at least one faulty partition from adversely affecting at least one non-faulty partition.

In some embodiments, the at least one faulty partition is a partition that is subjected to a cyber attack.

In some embodiments, the at least one SOA server is configured to provide the at least one service based at least in part on a quality of service (QoS) level associated with the at least one client ECU.

In some embodiments, the at least one service is selected from the group consisting of: i) a remote management service, ii) a remote monitoring service, iii) Over-The-Air (OTA) update service, iv) a symmetric cryptography service, v) an asymmetric cryptography service, vi) a certificate management service, vii) a central firewall service, viii) a secure storage service, ix) a lockdown service, x) an intrusion detection service, xi) an intrusion prevention service, xii) a secure processing service, xiii) a certificate authority (CA) service, xiv) communication security service, xv) an authentication service, xvi) an identity management service, xvii) a key management service, xviii) an update dissemination service, xix) a software recovery service, xx) a software flashing service, and xvii) any combination thereof.

In some embodiments, the SOA ECU further includes: at least one module that is configured to collect at least one of: i) vehicle-related data, and ii) user-related data regarding at least one user of the vehicle.

In some embodiments, the at least one module is further configured to cause to transmit the vehicle-related data, the user-related data, or both, to at least one electronic remote destination associated with a third party; where the at least one electronic remote destination is outside of the vehicle.

In some embodiments, the SOA ECU is further configured to allow for at least one of: i) introducing at least one real-time first approved software change into the SOA ECU, ii) introducing at least one real-time second approved change into the at least one SOA server, and iii) introducing at least one real-time third approved change in the at least one service.

In some embodiments, the at least one real-time second approved change is at least one of: 1) adding, in real-time, at least one new service to the at least one SOA server, 2) replacing, in real-time, the at least one service with the at least one new service, 3) removing, in real-time, the at least one service from the at least one SOA server, and 4) changing, in real-time, the configuration of the at least one SOA server.

In some embodiments, the at least one first real-time first approved change, the at least one real-time second approved change, and the at least one third real-time first approved change are introduced from at least one external source that is outside of the vehicle.

In some embodiments, at least one of the at least one real-time first approved change, the at least one real-time second approved change, and the at least one real-time third approved change is based at least in part on one of: i) at least one vehicle-specific characteristic of the vehicle, ii) at least one user-specific characteristic of the user, iii) at least one user request, iv) at least one service provider request, and v) at least one manufacturer request.

In some embodiments, the at least one service is added to the at least one SOA server during an assembly of the vehicle and where the at least one service is configured to be remotely activated for a particular time period during a lifetime of the vehicle.

In some embodiments, the at least one service is configured to be invoked via a dedicated application program interface (API) request that is available to a plurality of distinct client ECUs.

In some embodiments, the at least one SOA server is configured to provide a plurality of services to a plurality of distinct client ECUs in accordance with at least one security policy.

In some embodiments, the at least one security policy includes at least one rule that controls at least one of: i) access to a particular client ECU, ii) availability of at least one particular service to be utilized by the particular client ECU, iii) at least one QoS requirement, and iv) access to a particular hardware module of the SOA ECU.

In some embodiments, the at least one module is further configured to perform at least one action with the vehicle-related data, the user-related data, or both, prior to causing to transmit the vehicle-related data, the user-related data, or both.

In some embodiments, the present invention provides for an exemplary inventive method that includes at least the steps of: providing an electronic control unit having a service oriented architecture (SOA ECU), where the SOA ECU includes: at least one SOA server; where the SOA ECU is located within a vehicle; where the at least one SOA server is configured to provide at least one service to at least one client ECU that is located within the vehicle; and where the at least one SOA server is configured to assign at least one dedicated processing resource and at least one dedicated memory resource to provide the at least one service.

BRIEF DESCRIPTION OF THE DRAWINGS

The present invention can be further explained with reference to the attached drawings, wherein like structures are referred to by like numerals throughout the several views. The drawings shown are not necessarily to scale, with emphasis instead generally being placed upon illustrating the principles of the present invention. Therefore, specific structural and functional details disclosed herein are not to be interpreted as limiting, but merely as a representative basis for teaching one skilled in the art to variously employ the present invention.

FIGS. 1-11 show some exemplary aspects of the present invention depicted in accordance with at least some principles of at least some embodiments of the present invention.

DETAILED DESCRIPTION OF THE INVENTION

Among those benefits and improvements that have been disclosed, other objects and advantages of this invention can become apparent from the following description taken in conjunction with the accompanying figures. Detailed embodiments of the present invention are disclosed herein; however, it is to be understood that the disclosed embodiments are merely illustrative of the invention that may be embodied in various forms. In addition, each of the examples given in connection with the various embodiments of the present invention is intended to be illustrative, and not restrictive.

For example, while illustrative examples of various embodiments detailed herein are described to be implemented in the automotive industry, such as in various types of moving vehicles (e.g., cars, trucks, cranes, buses, etc.); many other implementations may become apparent to those of ordinary skill in the art; and the principles, methods, systems, and devices of the present invention can be similarly implemented in various other environments which utilize computing devices. For instance, the principles, methods, systems, and devices of the present invention can be implemented, with or without any modification(s) that may become apparent to those of ordinary skill in the art, in numerous industries, environments, and computing devices such as, but not limited to, aviation, industrial control, computers, medical devices, financial terminals, utilities management, home security, critical infrastructure computing systems (e.g., traffic lights, power grids, etc.), and other similarly suitable applications.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the invention may be readily combined, without departing from the scope or spirit of the invention.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. In some embodiments, the terms "instantaneous," "instantaneously," "instantly," and "in real time" refer to a condition where a time difference between a first time when an electronic request is transmitted and a second time when an electronic response to the request is received is no more than 1 second. In some embodiments, the time difference between the request and the response is between less than 1 second and several seconds (e.g., 5-10 seconds).

As used herein, the term "dynamic(ly)" means that events and/or actions can be triggered and/or occur without any human intervention. In some embodiments, events and/or actions in accordance with the present invention can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the terms "communication" and "message" can be used interchangeably and it shall be assumed that the communication can corresponds to a single message or to a plurality of messages.

As used herein, the term "runtime" corresponds to any behavior that is dynamically determined during an execution of a software application or at least a portion of software application.

In some embodiments, the inventive specially programmed computing systems with associated devices configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). In some embodiments, the inventive specially programmed computing systems with associated devices configured to process/track/manage interactions associated with at least 10 other electronic/computing devices (e.g., but not limited to, 10-99), at least 100 other electronic/computing devices (e.g., but not limited to, 100-999), at least 1,000 (e.g., but not limited to, 1,000-9,999), at least 10,000 other electronic/computing devices (e.g., but not limited to, 10,000-99,999), at least 100,000 other electronic/computing devices (e.g., but not limited to, 100,000-999,999), at least 1,000,000 other electronic/computing devices (e.g., but not limited to, 1,000,000-9,999,999), at least 10,000,000 other electronic/computing devices (e.g., but not limited to, 10,000,000-99,999,999), at least 100,000,000 other electronic/computing devices (e.g., but not limited to, 100,000,000-999,999,999), at least 1,000,000,000 other electronic/computing devices (e.g., but not limited to, 1,000,000,000-10,000,000,000).

As used herein, the term "security" refers to a cyber security.

As used herein, the term "safety" refers to the safe operation of the system from the functional perspective.

In some embodiments, the exemplary inventive computer system and the exemplary respective inventive device are configured to communicate with a multitude (e.g., up to 150) of Electronic Control Units (ECUs) which are responsible for a variety of vehicle functions (engine management, steering, pedals, electric windows, etc.). A typical ECU is a computer module containing its own processor, memory and peripherals required to implement its functions and interface it with other systems in the vehicle. A typical ECU contains firmware and software which execute the functions it is designed for.

In some embodiments, the exemplary inventive computer system and the exemplary respective inventive device allow to centralize the operation of a vehicle's numerous services/capabilities, such as advanced vehicle-to-vehicle (V2V) communication for increased safety, vehicle-to-infrastructure (V2I) communication for telemetry, communication with road and municipal infrastructure (e.g. traffic lights), communication with the local and national power gird for charging electric vehicles, infotainment with internet access and electronic wallet capabilities, and others. In some embodiments, the exemplary inventive computer system and the exemplary respective inventive device allow to centralize and provide common services that may be required to perform the vehicle's functions such as a remote management, Over-the-Air (OTA) update capability, update dissemination, ECU software flashing, ECU software recovery, monitoring, encryption, authentication, digital certificate and key management, secure storage, secure data processing, safe and secure in-vehicle testing of new capabilities, security monitor and others. In some embodiments, the exemplary inventive computer system and the exemplary respective inventive device allow to reduce the overall costs of the vehicle, reduce the integration and validation effort, which may impact the security posture, the more ECUs contain security features, the higher the chance that some of them implement such features incorrectly (e.g. software bug, inaccurately implemented protocol, non-secure implementation). For an exemplary vehicle, in some embodiments, the exemplary inventive computer system and the exemplary respective inventive device allow reducing the amount of external communications and/or advanced computing capabilities, leading to achieve, for example, on per vehicle basis, lower costs, lower weight and increased fuel efficiency.

In some embodiments, the exemplary inventive computer system and the exemplary respective inventive device utilize a Service Oriented Architecture (SOA) to provide common functions and interfaces which are configured as discrete and standalone components termed services. In some embodiments, the exemplary inventive computer system and the exemplary inventive device allow to offer the common services throughout the vehicle's network to any client of the exemplary vehicle's hardware/software as long as the client is approved to utilize those services according to the policy of the system. In some embodiments, the exemplary inventive computer system and the exemplary respective inventive centralized device allow to configure and utilize the common services as independent of the vendors who design/implement them and of the clients who are using them. In some embodiments, the exemplary inventive computer system and the exemplary respective inventive centralized device are designed to offer the common services via standardized protocols and/or Application Program Interfaces (APIs).

In some embodiments, the exemplary inventive computer system and the exemplary respective inventive centralized device allow to offer common services to an ECU which performs its own specific functions via a communication that may or may not be session-based type (e.g., HTTP session, TCP session, etc.). In some embodiments, the communication may be stateful or stateless. In some embodiments, the exemplary inventive computer system and the exemplary respective inventive centralized device allow to offer common service to automotive ECUs that are typically designed communicate through multiple network protocols, which are not typically designed to operate in a service oriented environment.

Typically, each vehicle's ECU is designed and manufactured by different Tier 1 suppliers. Typically, Tier 1 providers in the automotive industry are working only in the enclosed environments of their ECUs. Typically, integrating with other ECUs poses high implementation risks (components are typically designed to work in their own architecture with their own methodologies, integrating with others is not typically a design goal). Typically, the individualized development can lead to an increased scalability difficulty based on a need to account for the requirements of other ECUs. Under a typical design methodology, a service oriented architecture is not technologically and economically feasible implementation, for example, in the automotive industry.

In some embodiments, the exemplary inventive computer system and the exemplary respective inventive centralized device (the exemplary centralized ECU) are based on an embedded implementation of Service Oriented Architecture. In some embodiments, the exemplary inventive computer system and the exemplary respective inventive centralized device (the exemplary centralized ECU) can be employed in various suitable vehicles (e.g., automotive, rail, marine, aviation) and other similarly suitable embedded systems (e.g., industrial control, medical, critical infrastructure, etc.).

In some embodiments, the exemplary inventive computer system and the exemplary respective inventive centralized device (the exemplary centralized ECU) can be implemented in a form of an extensible, safe and secure SOA server which is capable of providing any services for all other ECUs in the vehicle interconnected through any of vehicle networks (e.g. CAN, Ethernet, LIN, MOST, FlexRay and others). This exemplary inventive SOA server of the exemplary centralized ECU can contain remote management services, remote monitoring services, Over-The-Air (OTA) update services, symmetric cryptography services (e.g. AES, DES), asymmetric cryptography services (e.g. RSA, ECC), certificate storage and verification against a certificate authority (CA), provide certificate authority services and issue and sign certificates and secure storage (e.g. encrypted memory, TPM (Trusted Platform Module)) service, a software image management and distribution service, software hosting service, data anonymization service, software sandbox service, centralized firewall, security configuration management, intrusion detection system (IDS), intrusion prevention system (IPS), and/or Lockdown Core (as described in U.S. patent application Ser. No. 15/486,055, which is hereby incorporated herein for all purposes consistent with the principles detailed herein).

In some embodiments the exemplary inventive SOA ECU can be used to securely collect, process store and/or transmit data from the vehicle to a service provider which may monetize this data and/or provide services based on it. In some embodiments, a service provider may be a Security Operations Center (SOC) in a form of a centralized facility that is responsible for every aspect of security of the vehicle.

In some embodiments the exemplary inventive SOA ECU can be used to securely collect, process store and transmit data from the vehicle to a service provider which may monetize this data. In some embodiments, the exemplary inventive SOA ECU can contain hardware modules to implement and accelerate some of the capabilities, such as HSM (Hardware Security Module) module, TPM (Trusted Platform Module) module and/or cryptographic coprocessor. In some embodiments, services provided by the exemplary inventive SOA ECU can be modified (added, subtracted, functionality changed, and/or configuration modified (such as rules, access lists etc.)) via an update to the exemplary inventive SOA ECU, including Over-The-Air (OTA) software update. In some embodiments, services can be preloaded in the factory, and remotely activated after the exemplary inventive SOA ECU is operational (e.g. additional capabilities sold after the vehicle was delivered to the customer). In some embodiments, services provided by the exemplary inventive SOA ECU can include adding capabilities such as, but not limited to, improved engine performance, modifying the suspension (e.g. for different road conditions, ice, winter) and adapting the driving mode (throttle response times, steering, etc.). Such capabilities can be remotely sent via an OTA update (for example, via a Internet cloud-based push or pull service); and/or activated, according to a demand; and/or be provided either indefinitely or for a set period of time. In some embodiments, the delivery of such capabilities can be remotely managed by a Internet cloud-based management solution. In some embodiments, the exemplary inventive SOA ECU can collect vehicle and/or user (e.g., driver, passenger) related data, securely store, process and/or transmit the collected data to a service provider. In some embodiments, the collected data may be configured to be tailored to service specific and/or user-specific need(s) and/or real world performance. In some embodiments, the collected data may be configured to be utilized by a third party to provide recommendation to the user (e.g., through an in vehicle assistant on the head unit) to, for example without limitation, modify the driving behavior of the user.

In some embodiments, the exemplary SOA ECU is designed to provide a real-time safe and secure environment for the various services to operate under, while completely isolating each discrete service component from one another (e.g., to prevent interference, ensure performance) and can also isolate the handling of each of the connected networks or clients (for safety and quality of service considerations—provide clients with a predetermined level of service and performance or avoid interconnecting safety critical clients/networks with non-safety critical clients/networks). In some embodiments, the exemplary SOA ECU can contain provisions which can allow for a generic service API for every type of network protocol needed. In some embodiments, the exemplary SOA ECU can be configured to allow legacy protocols (e.g. CAN, LIN) to utilize the benefits of this architecture while providing maximal performance for modern protocols (e.g., Ethernet).

In some embodiments, the exemplary SOA ECU can be configured to account for each level of performance required for each client (and/or network) and provide real-time quality of service (QoS) to the required level. This reduces both direct costs and also the complexity (and cost) of integration. Instead of the OEM paying for, testing and integrating the same functionality multiple times (since it was provided in multiple ECUs made by multiple Tier 1s), it will only be paid for, tested and implemented once and the other ECUs would assume that it is operating correctly and simply utilize it. In some embodiments, the exemplary SOA ECU improves the reliability of functions within the vehicle since critical or safety related services will be more thoroughly tested since the testing needs to be only conducted once. In some embodiments, the exemplary SOA ECU can be configured to meet a particular safety standard (e.g., ISO26262) and/or a particular cyber security standard (e.g., ISO15408), thus providing assurances that it is operating correctly. In some embodiments, the exemplary SOA ECU can be configured to so that, while the exemplary SOA ECU is certified as a platform, individual service(s) which is/are not safety/security critical do(es) not need to be certified.

In some embodiments, the exemplary inventive SOA ECU can be configured to in accordance with an exemplary design depicted in FIG. 1. For example, the exemplary inventive SOA ECU can be based on any suitable automotive computing hardware, such as, but not limited to, CPU/DSP/SoC/Microcontroller (e.g., Infineon Technologies AG'

TriCore™(Neubiberg, Germany), NXP Semiconductors N.V's MC57xx™ (Eindhoven, Netherlands), Renesas Electronics' R-Car (Tokyo, Japan), etc.). In some embodiments, the exemplary inventive SOA ECU can be configured to have a firmware layer, containing, for example, a Board Support Package—BSP, Architecture Support Package—ASP, or a combination of both.

In some embodiments, the exemplary inventive SOA ECU can be configured to run on an OS (e.g., AUTOSAR™, Linux™, other) or without (bare metal). In some embodiments, the exemplary inventive SOA ECU can be configured to contain an API which is configured to allow an access to all of its services and which can allow for authentication of client ECUs and/or encryption of traffic between the exemplary inventive SOA ECU and a particular client ECU or an external system (e.g., AUTOSAR based services API by Vector Informatik GmbH, Stuttgart Germany). In some embodiments, the exemplary inventive SOA ECU can be configured to prioritize a real-time handling of client requests (e.g., safety-critical ECU operations/requests shall receive a higher priority than non-safety ECUs). In some embodiments, the exemplary inventive SOA ECU can be configured to handle service requests on one or multiple request queues running on one or multiple processor cores. In some embodiments, the exemplary inventive SOA ECU can be configured to manage access to all of its services according to a predetermined security policy, which can be designed to selectively allow an access to certain services by certain ECUs, and/or deny access to some services by some ECUs. In some embodiments, the inventive SOA ECU can be configured to offload to hardware certain task(s) and/or transfer execution to auxiliary component(s).

In some embodiments, the exemplary inventive SOA ECU can be configured to be responsible for any protocol handling and parsing. For example, the exemplary inventive SOA ECU can be configured to provide an access to the services API via one or more network communication protocol (e.g., CAN, Ethernet, etc.). In some embodiments, the exemplary inventive SOA ECU can be configured as its own dedicated ECU or be a part of an existing ECU within a vehicle. In some embodiments, the exemplary inventive SOA ECU can be configured to utilize a DDS (Data Distribution Service), CORBA (Common Object Request Broker Architecture) and/or ESB (Enterprise Service Bus) infrastructure to allow for a communication and servicing of the API access over various network communication protocols.

In some embodiments, the exemplary inventive SOA ECU can be configured to contain secure firmware which ensures that drivers for the hardware (part of the firmware) aren't exploited to gain unauthorized access to the hardware or to make it operate in a different way than intended for the system. Secure firmware is typically firmware that is written to comply with relevant safety standards (e.g. ISO 26262) and security standards (e.g. ISO 15408). In some embodiments, the exemplary inventive SOA ECU can be configured to contain a certified separation kernel (e.g. Green Hills Software Integrity, WindRiver VxWorks, Sysgo Pike OS, etc.). This can allow for a safe and secure separation between various networks (powertrain, convenience, body, infotainment, etc.), clients and/or services. In some embodiments, the exemplary inventive SOA ECU can be configured to prevent clients from one network from affecting services and/or a quality of service provided to any other network. In some embodiments, the exemplary innovative SOA ECU can contain a separate partition for each network, where, for example, the separation kernel can be implemented such as to provide a safe and secure separation between partitions in both memory address spaces (e.g., storage memory—ROM/Flash, and runtime memory—RAM) and/or in the processor time (for example, each partition would have its dedicated static and predetermined time slot at which instructions from such partition would be inserted into the runtime context for execution). In some embodiments, the exemplary inventive SOA ECU can be configured to allocate time slots to partitions according to the required quality of service (a safety critical partition can receive a longer time slot to allow it priority access to services, or receive more time slots compared to non-safety critical partitions). For example, in accordance with one exemplary embodiment shown in FIG. 2, each partition can run its own instance of the SOA server with its specific subset of services which are available for the specific network. On top of the separation kernel there can be a hypervisor, thus each partition can contain an independent OS. Otherwise, in some embodiments, the exemplary inventive SOA ECU server can be configured for all services to run native (or "bare metal") on the separation kernel, or on any other mechanism which the hardware processor provides (e.g. separation through Memory Protection Unit (MPU) or through a security monitor like ARM TrustZone).

In some embodiments, the exemplary inventive SOA ECU can be configured to include a separation on the basis of client criticality and/or between safety-critical and/or non-safety ECUs or networks as shown in FIG. 3. Such exemplary architecture can provide specific services to safety critical ECUs and ensuring that the quality of service level are tailored for their requirements (ensuring processor and resource availability, mainly the time slot allocation for the safety critical partition). For example, without a hypervisor, all applications (the exemplary inventive SOA ECU server and services) run natively on the separation kernel.

As detailed herein, for example in FIGS. 2 and 3, even if a service is hosted within different partitions, the exemplary inventive SOA ECU doesn't have to be redeveloped or modified but can be used as a discrete functional unit which has an instance in several partitions.

In some embodiments, the exemplary inventive SOA ECU can be configured to allow for a reuse between common capabilities, such as security, and mitigate the need for each ECU and/or application to implement them locally. From a security perspective, the exemplary inventive SOA ECU can be configured to allow to monitor the overall security status of the system and react to any events as required. For example, security related components need to be implemented correctly and utilized appropriately, for instance, certificates need to be stored in access protected memory so that only the security mechanism allowed to access it. If the secure storage is encrypted, but any entity is allowed access to it, it is not secure. Thus, the exemplary inventive SOA ECU can be configured to improve the security of the entire system while saving resources. Moreover, by utilizing a separation kernel, a rogue/faulty application in a partition can be stopped from adversely affecting (e.g. Denial of Service (DoS) attacking) any other partition. From a safety perspective, the exemplary inventive computer system with this exemplary inventive SOA ECU architecture allows for the separation of services and clients according to the required level of safety and quality of service, while all being hosted on a single ECU. Other separation logic (how services are divided between partitions) can be used, while the partitions provide environments for services with common requirements (safety, security and criticality levels).

In one exemplary embodiment, as shown in FIG. 4, the exemplary inventive SOA ECU can be implemented on a remote management server, which will enable remote updates (OTA updates—Over-The-Air updates) to be disseminated to various ECUs within the vehicle. In addition, the exemplary inventive SOA ECU can support the OTA update of itself and the services which are provided by it. In some embodiments, beyond allowing for authentication and validation of remote updates, the exemplary inventive computer system with the exemplary inventive SOA ECU can be configured to extend authentication services to all other ECUs with external communication (e.g. V2X communication ECUs, telemetry ECUs, etc.). In one exemplary embodiment, the exemplary inventive computer system with the exemplary inventive SOA ECU can be configured to implement a Certificate Authority (CA) which would verify all digital certificates used for secure communications and authenticate the various parties in the communications. In some embodiments, the exemplary inventive computer system with the exemplary inventive SOA ECU can be configured to contain an extensible services API which can be programmed to be able to access to all available services. In some embodiments, the exemplary inventive computer system with the exemplary inventive SOA ECU can be configured to also serve as a gateway between interconnected networks by running a gateway service. In some embodiments, the exemplary inventive SOA ECU can be configured to connect directly to the gateway ECU (as if it is a separate subnetwork).

In one illustrative embodiment, the exemplary inventive computer system with the exemplary inventive SOA ECU can be based on a Xilinx, Inc.'s (San Jose, Calif.) Zynq® 7010 system-on-chip (SoC), which contains a dual core ARM A9 processor and Artix-7 FPGA. Such exemplary set-up can have 1 GB of DDR3 RAM and 4 GB of flash SSD, providing the operational and storage memory for the inventive system. An Ethernet interface can connect the server to one vehicle network, such as the infotainment network which is based on Ethernet communication through a built in Gigabit Ethernet controller in the Zynq and Marvell Alaska PHY (88E1116R). Another embodiment can utilize Broadcom BroadR-Reach Automotive Ethernet PHY. In FIG. 4, the V2X communication network (Vehicle-to-everything) communication can pass information from a vehicle to any entity that may affect the vehicle, and vice versa. Typically, a vehicular communication system incorporates at least one of other more specific types of communication such as, but not limiting to, V2I (Vehicle-to-Infrastructure), V2V (Vehicle-to-Vehicle), V2P (Vehicle-to-Pedestrian), V2D (Vehicle-to-Device) and/or V2G (Vehicle-to-Grid). In some embodiments, the exemplary inventive computer system with the exemplary inventive SOA ECU can be configured to be based on a CAN with Flexible Data-Rate (CAN FD—ISO 11898-1:2015) with support for high speed communication above 1 Mbps which can be implemented through an NXP MC33901 transceiver (PHY) and a controller implemented on the built in FPGA in the Zynq SoC (e.g. Bosch C_CAN FD8 IP Module). In some embodiments, a network interface, which the exemplary inventive computer system with the exemplary inventive SOA ECU can be configured to use, can be, for example but not limiting, a CAN 2.0B interface (ISO 11898-2:2003) based on the built in controller in the Zynq SoC and an external transceiver such as NXP TJA1040, all operating at transmission rates, for example, up to 1 Mbps.

In one illustrative embodiment, QNX Neutrino RTOS (Real-Time Operation System) microkernel can be used as a separation kernel. The cryptographic coprocessor is a dedicated chip which contains hardware acceleration for common cryptographic functions (e.g. AES encryption, SHA-1 hash calculation, RSA encryption and signature validation, random number generation and others). For this non-limiting embodiment, the NXP C291 coprocessor can be utilized. For example, FIG. 5 shows an exemplary architecture of such inventive remote management server hardware with the exemplary inventive SOA ECU.

In some embodiments, the exemplary inventive computer system with the exemplary inventive SOA ECU can be configured to utilize any suitable communication protocol to communicate with other ECUs (e.g., LIN, FlexRay, MOST, etc.). In some embodiments, the exemplary inventive SOA ECU can be configured such that the microkernel secures access to hardware resources (e.g. communication interfaces, cryptographic co-processor, etc.) so that every partition has access only to its allowed set resources, which are pre-determined in the main configuration of the exemplary inventive SOA ECU. In this embodiment, OTA updates can be communicated (from the automotive OEM remote update server) via an external wireless communication interface (e.g., 3G cellular) which would be connected to the infotainment ECU (or the infotainment head unit ECU, in case there are several), part of the infotainment network. For example, updates can be received by the OTA service and disseminated to the other interconnected networks (according to the set of ECUs which are relevant to the specific update) after validation. In some embodiments, updates to ECUs connected to the infotainment network can be also passed to the remote management server with the exemplary inventive SOA ECU, validated and then sent to the relevant ECUs. For example, to validate the updates, the OTA service can use the CA service which would manage all digital certificates (X509 compliant certificates). For example, the CA service would be able to verify the validity of a digital certificate provided by an external or internal communication party against a set of root certificates which the CA service would manage. For example, the OEM update server would be required to provide a valid certificate to authenticate with the CA service together with the update. This certificate would be validated using a root certificate which has been preloaded to the exemplary inventive SOA ECU during the vehicle's manufacturing. In some embodiments, root certificates used by the CA service can also be remotely updated as part of the update package. In some embodiments, the exemplary inventive computer system with the exemplary inventive SOA ECU can be configured to utilize an additional security measure of validating the integrity of the update file by calculating its hash (e.g., using SHA-256 algorithm) and comparing it to a hash value contained in a signed certificate (signed using standard asymmetric cryptography algorithms such as RSA, ECC), provided together with the update package. This allows the CA service to validate updates. Essentially, the CA service can serve a vehicle-wide root of trust. For example, the authentication service can verify a certificate using the common method of calculating the hash value of the certificate (for instance using SHA-256) and checking whether the signed hash value in the certificate was signed using the private key of the root certificate (using the public key of the root certificate). If the calculated hash value and the attached signed value (derived using the public key) in the certificate match, then it is verified.

In some embodiments, the exemplary inventive computer system with the exemplary inventive SOA ECU can be configured to manage telematics ECUs which can communicate with OEM and other suitable entities to send telemetry information about the vehicle and/or its usage (e.g., engine utilization, fuel efficiency, usage statistics, etc.). In some embodiments, the exemplary inventive computer system with the exemplary inventive SOA ECU can be configured to manage telematics ECUs that can also receive various commands to enable/disable features within themselves and/or other ECUs in the vehicle (e.g., enable various fuel efficiency modes, enable low performance mode in case of malfunction, etc.). For example, the telematics ECUs utilize the authentication service (which in turn can also utilize the CA service) in order to authenticate (through a PKI) the remote entities with which they are communicating. For example, each entity establishes a communication with a handshake containing its signed digital certificate (X509 compliant) which is verified by the authentication service. In one embodiment, the authentication service can utilize the functions of the CA service to perform some of its operations. In some embodiments, the CA service can have an instance in the infotainment partition to which all other partitions are using (through inter-partition communication mechanisms mediated by the kernel—such direct socket connection or message passing through shared memory). In another embodiment, the CA service can be replicated to every partition which requires it in order to avoid bottlenecks in utilization and access to the service from multiple partitions at once.

In some embodiments, the exemplary inventive computer system with the exemplary inventive SOA ECU can be configured to manage the V2X ECUs that can conduct real-time communication with external entities such as vehicles, pedestrians and/or infrastructure (traffic lights, roads, etc.). In some embodiments, such V2X communications can be encrypted. For example, the exemplary inventive computer system with the exemplary inventive SOA ECU can be configured to use a secure and efficient encryption algorithm AES256 for V2X communications by the V2X ECUs. In some embodiments, the exemplary inventive SOA ECU (the remote management server) can be configured to utilize a built-in cryptographic coprocessor and communication encryption service to encrypt and decrypt data to/from the V2X ECUs. For example, to select an appropriate encryption key, the communication encryption service can utilize the appropriate certificate (in case there are separate certificates for each entity or provider or municipality or any other separation) and which will allow both parties (the V2X ECU and the external entity) to exchange symmetric cryptography keys (using well known algorithms such as Diffie-Helman key exchange algorithms). The symmetric key would allow the coprocessor to encrypt and decrypt data at high speed (utilizing hardware acceleration) without the actual V2Xs ECUs handling any encryption and/or key management. For example, the authentication service can utilize the functions of the CA service to perform at least some of its operations.

FIG. 6 shows an example software architecture with network separation which the exemplary inventive computer system with the exemplary inventive SOA ECU (identified as "SOA Server") can utilize in some embodiments. In this exemplary architecture of the inventive remote management server with the exemplary inventive SOA ECU, each partition can only have access to the hardware required to communicate with its respective subnet (e.g. the infotainment network can have access to the Ethernet controller only and not to the CAN transceivers). Moreover, the access can be restricted to all hardware resources—for example, a partition whose services don't require access to the cryptographic coprocessor would not have an access. In some embodiments, the exemplary inventive computer system with the exemplary inventive SOA ECU can be configured to provide the access control via the microkernel/separation kernel which can securely restrict the hardware addresses which are accessible to each partition (e.g. through address mapping mechanism in the Memory Management Unit (MMU) or the MPU), and thus limit the hardware access. In some embodiments, the exemplary inventive computer system with the exemplary inventive SOA ECU can be configured to separate services according to networks (one partition per network) rather than separating services according to level of criticality (also a possibility in a different embodiment), or both. For example, the exemplary inventive computer system with the exemplary inventive SOA ECU can be configured to enforce such restriction through validating an identifying token (e.g., ECU ID) of the requesting ECU and/or by authenticating an ECU with cryptographic means (e.g., a certificate exchange). In some embodiments, the exemplary inventive computer system with the exemplary inventive SOA ECU can be configured to utilize the individual access server (inside the partition) to restrict which specific service have access to which hardware resources and/or to which other partitions. For example, access servers and services can be implemented as native applications on the separation kernel. For example, in the case of QNX Neutrino, they can be POSIX compliant application (since the microkernel is fully compliant with the POSIX API). Table 1 provides code of an example API for ECUs requesting services from an exemplary remote management server with the exemplary inventive SOA ECU.

```
/* OTA Service API */
// Function used to initiate a communication session between the OTA service
// and an external entity. The function verifies the identity of the external
// entity by validating that its details match a pre-determined rule set (IP,
// domain, server name, etc.) and that those details are reflected in the
// provided certificate (X509 compliant). Afterwards, the certificate is verified
// using the CA service. An error code is returned in case any of the stages fail.
// 0 is returned in case of success.
ERROR_CODE StartCommunicationSession(CERT ClientCertificate)
// Function to receive an OTA update file, certificate for that file (X509 compliant).
// The file contains which ECUs are relevant for the update.
// The OTA service verifies the file certificate by calculating the file
// hash and comparing it to the signed hash provided with the certificate.
// Once the file is verified it is communicated through the appropriate
// update channel to the required ECUs. The function return a list of errors
// for each ECU to be updated. 0 is returned in case of success.
ERROR_LIST ReceiveOTA(FILE UpdateFile, CERT FileCertificate)
/* CA Service API */
// Function which verifies a client certificate (X509 compliant). The certificate
```

```
// hash is calculated and compared to the signed hash provided in it.
// The appropriate root certificate is used to extract the signed hash
// according to the signing root CA described in the certificate, while
// the root certificate is stored within the CA.
BOOL IsVerifiedClient(CERT ClientCertificate)
/* Authentication Service API */
// The function verifies the identity of the external entity by validating
// that its details match the details in the provided certificate (X509 compliant)
// Afterwards, the certificate is verified using the CA service.
// FALSE is returned in case any of the stages fail.
// TRUE is returned in case of success.
BOOL AuthenticateClient(CERT ClientCertificate)
/* Communication Encryption Service API */
// Functions to encrypt and decrypt a block of data using AES 256
// The encryption key can be generated and stored internally in the cryptographic
// coprocessor without the client having access to it. It can be retained
// internally for future use.
DATA EncryptAES256(DATA PlainData);
DATA DecryptAES256(DATA EncryptedData);
// Function to generate a pseudo-random cryptography key of LENGTH bits
KEY GenerateKey(int LENGTH);
```

An example of an interactive service request is an Over-The-Air (OTA) update which is sent over the internet from an external OEM OTA updates server to the vehicle as shown in FIG. 7. This communication is received by the infotainment ECU, however all of the processing is done by OTA and CA services, on the infotainment server partition, running on the remote management server with the exemplary inventive SOA ECU. In some embodiments, the process would begin by the OEM OTA server sending a request to start an authenticated and encrypted communication session. To do that the OEM server would supply its signed digital certificate which would be validated by the remote management server with the exemplary inventive SOA ECU via the CA service. After validation, the remote management server with the exemplary inventive SOA ECU would generate a session key (using the CA service, for AES256 encryption which is used in this embodiment) and encrypt it using the public key from the OEM server certificate. This encrypted key would be sent back to the OEM server though the infotainment ECU. Afterwards, the OEM server would encrypt the update package (the update file and certificate individually) with the session key and send the encrypted update package to the infotainment ECU which would pass it to the OTA service in the remote management server with the exemplary inventive SOA ECU. The OTA service would decrypt the update package (using the CA service) and validate the integrity of the update file by validating the hash in the signed certificate which came with it and the actual calculated hash of the file (in this example the hash is calculate using SHA-256 and the signature of the certificate is done using a private key of the root CA of both the OEM server and the remote management server, both of which have the root certificate with its public key). After the update file would be validated, the OTA service would distribute it to all target ECU(s) to apply the update. These targeted ECU(s) would return the status of the operation (e.g. success, failure, errors, etc.) to the OTA service. The OTA service could combine all responses into a single list and send it back to the OEM server through the infotainment ECU (this list can also be sent in encrypted form using the session key). This step would conclude the session and update operation.

In one example, the exemplary inventive computer system with the exemplary inventive SOA ECU can be configured to accept API function calls, which would be communicated through the network by sending a message through, for example, the TCP/IP socket of the remote management server with the exemplary inventive SOA ECU and/or through the data section of CAN frames, that can be in the following format:
<Name_of_service>\n<length_input_1> <input_variable_1> <length_input_2> <input_variable_2> . . . ,
where the "length" would be the length in bytes of the input variable value. For example, the newline character ('\n' 0xA in ASCII) can separate the name of the service and the input/output values.

For example, the output of the service can be the result which would be sent to the client ECU in the following exemplary format:
<Name_of_service>\n<length_output><output_variable>

In another embodiment, the output can also contain multiple variables.

FIG. 8 illustrates an example of the API communication of a communication encryption service of the exemplary V2X server in the remote management server with the exemplary inventive SOA ECU. For example, a client on the V2X network with CAN ID 7 (in decimal) and 00000000111 (in binary) would need to encrypt traffic (using AES256) to send it through an external interface. This network would utilize 11 bit CAN identifiers (for example, in another embodiment, the V2X network could use 29 bit identifiers as described in the CAN protocol—ISO 11898-1:2015). In one example, the remote management server with the exemplary inventive SOA ECU is connected as CAN ID 15 (in decimal) and 00000001111 (in binary). The client would like to encrypt the string 'Parameters 10,5,65,0.4'. Once the communication encryption service would receive the request and interprets it, the remote management server with the exemplary inventive SOA ECU would verify whether this client has an encryption key which was generated for it. If this client doesn't, a key would be generated for it and stored on a dedicated partition in, for example but not limited to, the flash SSD (the storage partition would be mapped only to this service by the microkernel, this partition can also be encrypted in some embodiments). In some embodiments, the partition would contain a list of clients (identified by their CAN IDs) and respective keys for each. Once a new client would be added, an entry would be added into the list. The list can also contain the date and time when the key was generated so the list can be refreshed every predefined period of time. Once the communication encryption service would receive the key, the communication encryption service would encrypt the message and sends it back to the client. In this example, the message is padded to a block of 256 bits (minimal bock size for AES256, padded with 0 zeros at the end). In this example, it is assumed that the resulting encrypted 256 bit block (32 bytes) is represented by the following ASCII sequence "↑LV2Mc6JFK5Zx?5S=KZQc#U+<!t8'@". Thus, the client would be able to encrypt communication without doing any cryptographic operations and without being exposed to the encryption key. In case the key would be needed to be communicated to the other external party, it can be delivered using asymmetric PKI encryption once it is generated or changes. In this particular example, the remote management server with the exemplary inventive SOA ECU is configured to enable one centralized point to receive, verify, manage and distribute all OTA updates. In this particular example, the remote management server with the exemplary inventive SOA ECU is configured to provide other communication security services such as encryption and authentication. In some embodiments, this inventive implementation would alleviate the need from any ECU that requires an ability to communicate externally to include any individual security capabilities.

FIG. 9 shows anexemplary security server architecture of the exemplary inventive SOA ECU (identified as "security server" in FIG. 9) which would be configured to provide centralized security services to other vehicle ECUs. In this particular embodiment, the exemplary inventive SOA ECU (the security server) would be configured to provide a safe and secure separation between the various automotive networks connected to it. Services are provided independently for each network. The exemplary inventive SOA ECU (the security server) would provide a generic interactive services API to any other ECU. For example, the exemplary API would be extensible to support any services, even future extensions. In some embodiments of the example of FIG. 9, the inventive security server can be based on a Renesas R-Car E2 (R8A7794) system-on-chip (SoC), which can contain a dual core ARM A7 processor, a SH-4A CPU core, onboard cryptographic coprocessor for acceleration of AES256 symmetric encryption, and a hash calculation module using SHA-256 and RSA asymmetric encryption. In one example, the inventive security server can have 2 GB of DDR3 RAM and 16 GB of flash SSD to provide the operational and storage memory for the system. In one example, the inventive security server can have an Ethernet interface that can connect the inventive security server to one vehicle network, such as the V2X communication network, and can be based on the Ethernet controller built into the R-Car E2 and an external Ethernet PHY module such as, but not limited to, NXP TJA1100. In one example, a high speed CAN 1 Mbps interface (ISO 11898 compliant) can be employed to connect the inventive security server to another vehicle network, such as the body network (controls functions such as door lock/unlock, alarm, immobilizer, Remote Keyless Entry, smart key, etc.). In one example, the interface can be based on the built-in controller on the R-Car E2 and an external transceiver such as NXP TJA1040. In one example, the inventive security server can utilize the Sysgo PikeOS separation kernel and hypervisor as part of the software infrastructure. In some examples, the inventive security server can utilize any sufficiently suitable communication protocol to communicate with other ECUs (e.g., CAN, LIN, FlexRay, MOST, etc.). In some examples, the inventive security server can utilize at least one session based protocol.

FIG. 10 shows an exemplary security services architecture of the exemplary inventive SOA ECU which would be utilized to provide, for example, data and communication encryption services (for example, required by the ECUs in the V2X network) to secure the external communication from/to the vehicle. For example, the vehicle's body ECUs would require a secure storage service to support credentials for, for example, the alarm, immobilizer and remote keyless entry systems. In some embodiments, provided encryption services can include any encryption protocol (e.g., AES, DES and others). In some embodiments of the inventive architecture of FIG. 10, the encryption of data at rest (for secure storage or secure boot purpose for example) can be implemented using AES256 algorithm and the encryption of the transmitted data can be performed using AES256. In one illustrative embodiment, the exemplary inventive SOA ECU as the security server can employ the authentication with external communications. In one illustrative embodiment, the exemplary inventive SOA ECU as the security server perform the authentication of the communicating parties, for instance, by exchanging signed certificates by a trusted third party. In one illustrative embodiment, the exemplary inventive SOA ECU would be configured to verify certificates using a PKI infrastructure and then using asymmetric cryptography, symmetric keys would be exchanged by the Diffie-Hellman algorithm. In one illustrative embodiment, the exemplary inventive SOA ECU would be configured to employ asymmetric cryptography services (e.g. RSA, Elliptic Curve Cryptography (ECC), etc.). In one illustrative embodiment, PKI certificates can conform to standard X509 certificates and asymmetric cryptography can be implemented using ECC. In one illustrative embodiment, to store encryption keys and certificates, the exemplary inventive SOA ECU acting as the security server can utilize a dedicated 1 GB partition in, for example, the flash drive in which all data would be stored in an encrypted manner (using, for example, AES256 coprocessor on the SoC and/or the data encryption service) as encrypted files. For example, the main encryption key can be stored inside a dedicated on-chip secure storage in SoC cryptographic coprocessor. In yet another embodiment, encryption keys and certificates can be transient (generated per session or in real time and stored in volatile memory such as RAM). In some embodiments, each network can have a dedicated security server in a separate partition of the exemplary inventive SOA ECU, supporting the required services. For example, each service can be hosted as a separate process (separate application) or the security server process can host all functions and open a separate threads for each service and each client. For example, the security server service offered by the exemplary inventive SOA ECU can run as an operating system service or daemon (in case of Linux) in the background and listen for new client connection requests. For example, if the inventive security server services the body network, no OS would be used since the secure storage service would be simple and the overhead of an OS would be minimized. For example, the body security server can be implemented as a native application sitting on top of the separation kernel.

Table 2 provides an exemplary code corresponding to API request call to external systems by the inventive security server (the exemplary inventive SOA ECU) while providing a service to a client on the V2X Ethernet network (for example IP 10.0.0.58). For example, the client would send a message to the listening port of the inventive security server (e.g. port 62320 on IP 10.0.0.25 of the security server) and in the message the client would identify the required service and all required input data. For example, for the body network, the client can send a name of the service and input data through one or more CAN frames. In some embodiments, the communication with between the inventive security server and the client can be authenticated and encrypted, for instance in Ethernet based networks using SSL/TLS using digital certificates which both the client and the inventive security server would be preloaded with and which would be signed by a trusted certificate authority (the security server itself can also act as a certificate authority). A code based example for the API of the security server to external systems is presented below. Additional services which are added will add their own API calls.

input to the security server or, once the key would be generated internally, such key can also be returned to the client for future use (for instance, to encrypt communication where the key must be exchanged with the other party). In some embodiments, the exemplary inventive security server (identified as "server" in FIG. 11) can utilize a secure storage as shown, for example, in FIG. 11. For example, to securely store a piece of data, the exemplary inventive security server can utilize the unique client key (client can identified by its IP or by other means such as any ID). For example, the secure storage service can invoke the encryption service internally, receive the encrypted data and store the key as a file under the name "ClientIP.VarName.data" in the dedicated partition.

TABLE 2

```
/* Secure Storage API */
// Read/write data from secure storage
// The input is the name of variable to read/write and a buffer to read/write from/into
DATA ReadSecureStorage(NAME VarName);
VOID WriteSecureStorage(NAME VarName, DATA buffer);
/* Data Encryption Service API */
// Functions to encrypt and decrypt a block of data using AES 256
// The encryption key can be generated and stored internally in the cryptographic coprocessor
// without the client having access to it. It can be retained internally for
// future use.
DATA EncryptAES256(DATA PlainData);
DATA DecryptAES256(DATA EncryptedData);
// Function to generate a pseudo-random cryptography key of LENGTH bits
KEY GenerateKey(int LENGTH);
/* Communication Encryption Service API */
// Functions to encrypt and decrypt a block of data using elliptic curve cryptography
DATA EncryptECC(DATA PlainData, DATA EncryptedData);
DATA DecryptECC(DATA PlainData, DATA EncryptedData);
/* Authentication Service API */
// Function to verify a signed digital certificate according to its certification authority
BOOL VerifyCertificate(CERT ClientCertificate);
```

For example, to encrypt a block of data using AES256, a client on the V2X network would send a message to port 62320 of the exemplary inventive security server (the exemplary inventive SOA ECU) which would contain the following data:
"EncryptAES256 19 asdjnkasdn43254.sda",
where "asdjnkasdn43254.sda" would be the data to be encrypted and its length would be 19 bytes (or characters, which will be padded to 32 characters with 0—minimal block size for AES256 is 32 bytes). The result can be the encrypted data sent back to the client through the opened port: "EncryptAES256 32 lkajsdlksadj87asd!!jd/kfd;skmfds", assuming that "lkajsdlksadj87asd!!jd/kfd;skmfds" would be the encrypted text.

In some embodiments, for the encryption key, the exemplary security service of the exemplary inventive security server can generate a unique key for every client which it would use the key to encrypt data. For example, keys can be stored in a dedicated storage in the cryptographic coprocessor (which would be built into the exemplary inventive security server) or, if the amount of keys is large, keys can be stored in a separate file containing a list of client IDs and keys inside a secure partition. For example, such file can be encrypted by a unique security server encryption key which would be stored inside the cryptographic coprocessor. In some embodiments, a dedicated secure storage device (e.g. flash) can be connected directly to the SoC and accessible only by a process of the inventive security server (protected by separation kernel permissions) and all keys can be stored there. In some embodiments, the encryption key can be an For example, the exemplary inventive security server offering a centralized implementation of security services increases the level of security of the inventive system and the overall vehicle. For example, since security related features have to be implemented correctly and require a meticulous testing, the centralized implementation of security services allows to reduce risks of each application or ECU having its own security implementation, which might be unsecure. The present invention allows to centralize all security related capabilities into a secure, verified and certified inventive system, thus increasing reliability in security mechanisms. For example, as the needs of the various ECUs to progress through software updates and/or the addition of ECUs, the inventive security server can also be updated (through a software update) to allow for additional services. For example, the centralized implementation in accordance with the principles of the present invention reduces costs and increases flexibility since there is only one instance required for each capability and such instance can serve as many clients as required. For example, if a new application or ECU requires particular services, all such new application or ECU needs to do is to request such services from the inventive security server. In some embodiments, the exemplary inventive architecture is configured to minimize difficulties with having a service-oriented architecture in a tiered value chain industry. For example, since the SOA ECU is a fully independent system, which has a standard API which can be communicated over any automotive protocol and not requiring any sessions or synchronization with other ECUs. For example, every Tier 1 manufacturer can rely on an interface specification (list of messages which a particular SOA ECU needs to receive and transmit). And each Tier 1 implements the respective ECU completely independently, accessing only the services which are required by it in a completely asynchronous fashion. Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object oriented programming), and the type of computer programming languages that may be used (e.g., C++, Basic, AJAX, JavaScript). The aforementioned examples are, of course, illustrative and not restrictive.

In some embodiments, the exemplary inventive SOA ECU may be configured/programmed to allow entities such as, but not limited, automotive companies and suitable third parties to provide, remotely and/or in real time, one or more value-added services to users throughout a vehicle life cycle. In some embodiments, the exemplary inventive SOA ECU may be configured/programmed to allow for continuous personalization of the user's experience which yields a continuous revenue stream to suppliers as if in a case of subscription-like arrangement.

In some embodiments, the present invention provides for an exemplary inventive system that includes at least the following components: an electronic control unit having a service oriented architecture (SOA ECU), where the SOA ECU includes: at least one exemplary inventive SOA server; where the SOA ECU is located within a vehicle; where the at least one SOA server is configured to provide at least one service to at least one client ECU that is located within the vehicle; and where the at least one SOA server is configured to assign at least one dedicated processing resource and at least one dedicated memory resource to provide the at least one service.

In some embodiments, the exemplary SOA ECU further includes: at least one first partition, including: at least one first SOA server; where the at least one first SOA server is configured to provide at least one first service to at least one first client ECU; where the at least one first SOA server is configured to assign at least one first dedicated processing resource and at least one first dedicated memory resource to provide the at least one first service; at least one second partition, including: at least one second SOA server; where the at least one second SOA server is configured to provide at least one second service to at least one second client ECU; where the at least one second SOA server is configured to assign at least one second dedicated processing resource and at least one second dedicated memory resource to provide the at least one second service; where the at least one first partition and the at least one second partition are operationally separated from each other via a separation kernel.

In some embodiments, the at least one first partition is configured to execute at least one first operating system (OS) with the at least one first dedicated processing resource and the at least one first dedicated memory resource; and where the at least one second partition is configured to execute at least one second OS with the at least one second dedicated processing resource and the at least one second dedicated memory resource; and where the at least one first dedicated processing resource and the at least one second dedicated processing resource are part of at least one dedicated hardware module; where the separation kernel is configured to separately provide to the at least one first dedicated processing resource and the at least one second dedicated processing resource a respective separate access for performing the at least one first service or the at least one second service respectively; and where the at least one first dedicated memory resource and the at least one second dedicated memory resource are part of the at least one dedicated hardware module; and the separation kernel is configured to separately provide to the at least one first dedicated memory resource and the at least one second dedicated memory resource a respective separate access for performing the at least one first service or the at least one second service respectively.

In some embodiments, the at least one first SOA server is a safety critical server and the at least one second SOA server is a non-safety critical server.

In some embodiments, the at least one first client ECU is associated with at least one first network; where the at least one second client ECU is associated with at least one second network; and where the at least one first network and the at least one second networks are distinct networks.

In some embodiments, the separation kernel is configured to prevent or stop at least one faulty partition from adversely affecting at least one non-faulty partition.

In some embodiments, the at least one faulty partition is a partition that is subjected to a cyber attack.

In some embodiments, the at least one SOA server is configured to provide the at least one service based at least in part on a quality of service (QoS) level associated with the at least one client ECU.

In some embodiments, the at least one service is selected from the group consisting of: i) a remote management service, ii) a remote monitoring service, iii) Over-The-Air (OTA) update service, iv) a symmetric cryptography service, v) an asymmetric cryptography service, vi) a certificate management service, vii) a central firewall service, viii) a secure storage service, ix) a lockdown service, x) an intrusion detection service, xi) an intrusion prevention service, xii) a secure processing service, xiii) a certificate authority (CA) service, xiv) communication security service, xv) an authentication service, xvi) an identity management service, xvii) a key management service, xviii) an update dissemination service, xix) a software recovery service, xx) a software flashing service, and xvii) any combination thereof.

In some embodiments, the SOA ECU further includes: at least one module that is configured to collect at least one of: i) vehicle-related data, and ii) user-related data regarding at least one user of the vehicle.

In some embodiments, the at least one module is further configured to cause to transmit the vehicle-related data, the user-related data, or both, to at least one electronic remote destination associated with a third party; where the at least one electronic remote destination is outside of the vehicle.

In some embodiments, the SOA ECU is further configured to allow for at least one of: i) introducing at least one real-time first approved software change into the SOA ECU, ii) introducing at least one real-time second approved change into the at least one SOA server, and iii) introducing at least one real-time third approved change in the at least one service.

In some embodiments, the at least one real-time second approved change is at least one of: 1) adding, in real-time, at least one new service to the at least one SOA server, 2) replacing, in real-time, the at least one service with the at least one new service, 3) removing, in real-time, the at least one service from the at least one SOA server, and 4) changing, in real-time, the configuration of the at least one SOA server.

In some embodiments, the at least one first real-time first approved change, the at least one real-time second approved change, and the at least one third real-time first approved change are introduced from at least one external source that is outside of the vehicle.

In some embodiments, at least one of the at least one real-time first approved change, the at least one real-time second approved change, and the at least one real-time third approved change is based at least in part on one of: i) at least one vehicle-specific characteristic of the vehicle, ii) at least one user-specific characteristic of the user, iii) at least one user request, iv) at least one service provider request, and v) at least one manufacturer request.

In some embodiments, the at least one service is added to the at least one SOA server during an assembly of the vehicle and where the at least one service is configured to be remotely activated for a particular time period during a lifetime of the vehicle.

In some embodiments, the at least one service is configured to be invoked via a dedicated application program interface (API) request that is available to a plurality of distinct client ECUs. In some embodiments, the at least one SOA server is configured to provide a plurality of services to a plurality of distinct client ECUs in accordance with at least one security policy.

In some embodiments, the at least one security policy includes at least one rule that controls at least one of: i) access to a particular client ECU, ii) availability of at least one particular service to be utilized by the particular client ECU, iii) at least one QoS requirement, and iv) access to a particular hardware module of the SOA ECU.

In some embodiments, the at least one module is further configured to perform at least one action with the vehicle-related data, the user-related data, or both, prior to causing to transmit the vehicle-related data, the user-related data, or both.

In some embodiments, the present invention provides for an exemplary inventive method that includes at least the steps of: providing an electronic control unit having a service oriented architecture (SOA ECU), where the SOA ECU includes: at least one SOA server; where the SOA ECU is located within a vehicle; where the at least one SOA server is configured to provide at least one service to at least one client ECU that is located within the vehicle; and where the at least one SOA server is configured to assign at least one dedicated processing resource and at least one dedicated memory resource to provide the at least one service.

While a number of embodiments of the present invention have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

What is claimed is:

1. A system, comprising:
   an electronic control unit having a service oriented architecture (SOA ECU);
   wherein the SOA ECU is located within a vehicle;
   wherein the SOA ECU comprises:
      at least one partition that comprises:
         at least one SOA server;
            wherein the at least one partition is associated with a kernel that is configured to provide at least one of:
               i) a secure separation functionality,
               ii) a secure partitioning functionality,
               iii) secure hypervisor functionality, or
               iv) any combination thereof;
            wherein the at least one SOA server is configured to provide at least one service to at least one first client ECU;
            wherein the at least one first SOA server is configured to assign at least one first service dedicated processing resource and at least one service dedicated memory resource to provide the at least one service;
            wherein the at least one service comprises at least one security service configured to perform at least one of the following:
               i) verifying at least one first communication to the at least one partition;
               ii) verifying at least one second communication from the at least one partition;
               iii) verifying at least one third communication within the at least one partition;
               iv) validating the at least one first communication to the at least one partition;
               v) validating the at least one second communication from the at least one partition;
               vi) validating the at least one third communication within the at least one partition; or
               vii) any combination thereof.

2. The system as recited in claim 1, wherein the at least one security service is configured to implement a predefined security policy.

3. The system as recited in claim 1, wherein the at least one security service comprises at least one of the following:
   i) an intrusion detection system (IDS) service,
   ii) an intrusion protection system (IPS) service,
   iii) a certificate validation service (CA service),
   iv) an encryption service,
   v) a secure communication Lockdown service, or
   iv) any combination thereof.

4. The system as recited in claim 1, wherein the kernel is a separation kernel; and
   wherein the separation kernel is configured to mediate at least one of the at least one first communication, the at least one second communication, or the at least one third communication, by utilizing the at least one security service.

5. The system as recited in claim 4, wherein the separation kernel is configured to route one or more of the at least one first communication, the at least one second communication, and the at least one third communication via a routing through the at least one security service.

6. The system as recited in claim 5, wherein the routing through the at least one security service comprises a non-bypassable mandatory routing enforced by the separation kernel.

7. The system as recited in claim 1, wherein the at least one security service is locally implemented in a security partition of the at least one partition; and
    wherein the at least one security service is managed by the at least one SOA server.

8. The system as recited in claim 1, wherein at least one of the at least one first communication, the at least one second communication, and the at least one third communication is between a plurality of services that are provided by the at least one SOA server.

9. The system as recited in claim 1, wherein at least one of the at least one first communication, the at least one second communication, or the at least one third communication is between:
    i) services other than the at least one service;
    ii) applications; or
    iii) both services and applications.

10. The system as recited in claim 1, wherein at least one of the at least one first communication, the at least one second communication, or the at least one third communication is between two or more partitions of a common ECU.

11. The system as recited in claim 1, wherein at least one of the at least one first communication, the at least one second communication, or the at least one third communication is between separate ECUs of the vehicle, between an ECU of the vehicle and an external entity relative to the vehicle, or both.

12. The system as recited in claim 1, wherein the at least one security service is configured to utilize an external service.

13. The system as recited in claim 1, wherein the at least one security service comprises a Common Object Request Broker Architecture (CORBA).

14. The system as recited in claim 13, wherein the CORBA implements at least a portion of a security policy; and
    wherein the security policy comprises a set of security rules.

15. The system as recited in claim 1, wherein the at least one security service comprises a Data Distribution Service (DDS).

16. The system as recited in claim 15, wherein the DDS is configured implement one or more rules of a security policy.

17. The system as recited in claim 1, wherein the SOA ECU further comprises an enterprise service bus (ESB); and
    wherein the at least one SOA server routes the at least one communication through the ESB.

18. The system as recited in claim 17, wherein the ESB is configured implement one or more rules of a security policy.

19. The system as recited in claim 1, wherein at least one of the at least one first communication, the at least one second communication, or the at least one third communication is within the at least one partition.

20. The system as recited in claim 1, wherein at least one of the at least one first communication, the at least one second communication, or the at least one third communication is between two or more services or two or more applications distributed in one or more of the following ways:
    i) at least two in the same partition;
    ii) at least one in one partition and one in a different partition within a same ECU;
    iii) at least one running on a separate kernel within the same ECU;
    iv) at least one running on a separate processing resource within the same ECU;
    v) at least one in another ECU within the vehicle; and
    vi) at least one in an external entity relative to the vehicle.

21. A method, comprising:
    providing an electronic control unit having a service oriented architecture (SOA ECU);
        wherein the SOA ECU is located within a vehicle;
        wherein the SOA ECU comprises:
            at least one partition that comprises:
                at least one SOA server;
                    wherein the at least one partition is associated with a kernel that is configured to provide at least one of:
                        i) a secure separation functionality,
                        ii) a secure partitioning functionality,
                        iii) secure hypervisor functionality, or
                        iv) any combination thereof;
                    wherein the at least one SOA server is configured to provide at least one service to at least one first client ECU;
                    wherein the at least one first SOA server is configured to assign at least one first service dedicated processing resource and at least one service dedicated memory resource to provide the at least one service;
                    wherein the at least one service comprises at least one security service configured to perform at least one of the following:
                        i) verifying at least one first communication to the at least one partition;
                        ii) verifying at least one second communication from the at least one partition;
                        iii) verifying at least one third communication within the at least one partition;
                        iv) validating the at least one first communication to the at least one partition;
                        v) validating the at least one second communication from the at least one partition;
                        vi) validating the at least one third communication within the at least one partition; or
                        vii) any combination thereof.

22. The method as recited in claim 21, wherein the at least one security service is configured to implement a predefined security policy.

23. The method as recited in claim 21, wherein the at least one security service comprises at least one of the following:
    i) an intrusion detection system (IDS) service,
    ii) an intrusion protection system (IPS) service,
    iii) a certificate validation service (CA service),
    iv) an encryption service,
    v) a secure communication Lockdown service, or
    iv) any combination thereof.

24. The method as recited in claim 21, wherein the kernel is a separation kernel; and
    wherein the separation kernel is configured to mediate at least one of the at least one first communication, the at least one second communication, or the at least one third communication, by utilizing the at least one security service.

25. The method as recited in claim 24, wherein the separation kernel is configured to route one or more of the at least one first communication, the at least one second communication, and the at least one third communication via a routing through the at least one security service.

26. The method as recited in claim 25, wherein the routing through the at least one security service comprises a non-bypassable mandatory routing enforced by the separation kernel.

27. The method as recited in claim 21, wherein the at least one security service is locally implemented in a security partition of the at least one partition; and wherein the at least one security service is managed by the at least one SOA server.

28. The method as recited in claim 21, wherein at least one of the at least one first communication, the at least one second communication, and the at least one third communication is between a plurality of services that are provided by the at least one SOA server.

29. The method as recited in claim 21, wherein at least one of the at least one first communication, the at least one second communication, or the at least one third communication is between:
   i) services other than the at least one service;
   ii) applications; or
   iii) both services and applications.

30. The method as recited in claim 21, wherein at least one of the at least one first communication, the at least one second communication, or the at least one third communication is between two or more services or two or more applications distributed in one or more of the following ways:
   i) at least two in the same partition;
   ii) at least one in one partition and one in a different partition within a same ECU;
   iii) at least one running on a separate kernel within the same ECU;
   iv) at least one running on a separate processing resource within the same ECU;
   v) at least one in another ECU within the vehicle; and
   vi) at least one in an external entity relative to the vehicle.

* * * * *